(12) United States Patent
Servantie et al.

(10) Patent No.: US 7,353,091 B2
(45) Date of Patent: Apr. 1, 2008

(54) METHOD OF DISPLAYING CARTOGRAPHIC INFORMATION AND AERONAUTICAL ZONES ON AN AIRCRAFT SCREEN

(75) Inventors: Xavier Servantie, Pessac (FR); Alain Goetz, Merignac (FR); Eric Filliatre, Merignac (FR)

(73) Assignee: Thales (FR)

( * ) Notice: Subject to any disclaimer, the term of this patent is extended or adjusted under 35 U.S.C. 154(b) by 289 days.

(21) Appl. No.: 11/199,364

(22) Filed: Aug. 9, 2005

(65) Prior Publication Data
US 2006/0217853 A1    Sep. 28, 2006

(30) Foreign Application Priority Data
Aug. 10, 2004  (FR)  .................................. 04 08801

(51) Int. Cl.
G05D 1/00       (2006.01)
(52) U.S. Cl. .............................. 701/4; 701/3; 701/208; 340/995.27
(58) Field of Classification Search .................... 701/3, 701/4, 7, 8, 13–16, 208, 212, 300; 340/995.14, 340/995.15, 995.27; 345/694
See application file for complete search history.

(56) References Cited
U.S. PATENT DOCUMENTS
5,936,552  A     8/1999  Wichgers et al.

| 7,084,871 B2* | 8/2006 | Jardin et al. ................. 345/421 |
| 7,158,152 B2* | 1/2007 | Jardin et al. ................. 345/634 |
| 2002/0143439 A1 | 10/2002 | Morizet et al. |
| 2003/0193411 A1 | 10/2003 | Price |
| 2004/0210390 A1* | 10/2004 | Jardin ......................... 701/300 |
| 2005/0052451 A1 | 3/2005 | Servantie |

FOREIGN PATENT DOCUMENTS
EP         1 087 210 A      3/2001

* cited by examiner

Primary Examiner—Gertrude A. Jeanglaude
(74) Attorney, Agent, or Firm—Lowe Hauptman Ham & Berner, LLP

(57) ABSTRACT

The field of the invention is that of methods of synthesizing cartographic images presented on display devices. This method is applied more specifically to visual flight on rotary-wing aircraft. The method according to the invention is used to present the useful aeronautical map information superimposed on a conventional altimetric presentation of the terrain being flown over, while retaining a legibility that is acceptable to the user. Flight safety is thus significantly reinforced. To obtain an enhanced legibility, the method displays only the aeronautical zones included in an altitude band corresponding to the flight phase of the aircraft and dependent on the geographic location and the vertical position of the aircraft. The method is used to display the cartographic representation either on a single window comprising a plan view of the terrain being flown over, or on two windows respectively representing a plan view and a cross-sectional view of the terrain being flown over.

11 Claims, 6 Drawing Sheets

METHOD OF DISPLAYING CARTOGRAPHIC INFORMATION AND AERONAUTICAL ZONES ON AN AIRCRAFT SCREEN

RELATED APPLICATIONS

The present application is based on, and claims priority from French Application Number 04 08801, filed on Aug. 10, 2004, the disclosure of which is hereby incorporated by reference herein in its entirety.

FIELD OF THE INVENTION

The field of the invention is that of methods of synthesizing cartographic images presented on display devices. This method is applied more specifically to aircraft likely to maneuver by visual flight, these aircraft possibly being military or rotary-wing aircraft or general aviation aircraft.

BACKGROUND OF THE INVENTION

On modern aircraft, the instrument panel includes electronic displays for presenting to the pilot the important flight or navigation control information.

The information useful for navigation is:
cartographic data concerning the terrain being flown over, taken from digital databases;
information linked to the aeronautical maps such as the obstacles, beacons, air routes, aeronautical zones, terminal management approaches (TMA) and control zones (CTR).

An aeronautical zone is a zone defined by the aeronautical regulations. The main zone types are TMA, CTR and restricted or prohibited access zones. These zones are delimited by a geographic contour, by a ceiling altitude and a floor altitude. These zones also have associated names and radio frequencies.

The aeronautical zones are normally represented by a series of geometrical figures, particularly on paper aeronautical maps. They are conventionally represented by a fine continuous line, defining the limit of the zone and by a semi-transparent border indicating the interior side of the zone. The line and the border are colored according to the type of aeronautical zone, the color being defined by air regulations. For example, prohibited access zones are red, restricted access zones are magenta.

A box is associated with each zone containing a key, the content of which is regulated. The box contains the name of the zone and, where appropriate, its radio frequency, its type, its ceiling and its floor.

Digital cartography presentations on electronic displays rarely include the information associated with the aeronautical maps which contain an excessive density of information. FIG. 1 represents a cartographic image 1 in plan view of a terrain being flown over by an aircraft, the cartographic image containing both relief information 3 described by horizontally cross-hatched lines and information 2 linked to the aeronautical maps. The boundaries of the aeronautical zones are described by oblique cross-hatched lines bounded by a fine continuous line. The aeronautical zones 2 overlap, making the map difficult to read. All the boxes 4 are displayed, which further clutters the display without actually providing the pilot with important information. Consequently, the presentation becomes illegible to the user.

However, an aircraft moving in an air space needs to be able to anticipate entry into an aeronautical zone. Depending on circumstances, the pilot needs to avoid the zone, contact a radio frequency before entering it or take special measures concerning air regulations. It is therefore important for a pilot to know the geographic position of these zones and anticipate entry into these zones.

SUMMARY OF THE INVENTION

The method according to the invention is used to present the useful aeronautical map information while retaining a legibility that is acceptable to the user. Flight safety is thus significantly improved.

More specifically, the subject of the invention is a method of synthesizing, on an aircraft screen, at least one first window representing a cartographic image in plan view of a terrain being flown over by said aircraft, the cartographic image being generated from first altimetric information of the terrain being flown over and second information representing the aeronautical zones, wherein the method displays, in said window, an altimetric representation of the terrain being flown over including the aeronautical zones included in an altitude band corresponding to the flight phase of the aircraft.

Advantageously, the method comprises at least steps for automatically filtering the aeronautical zones according to the geographic location and the vertical position of the aircraft. The filtering steps according to the vertical position of the aircraft are:

Computation of the lower and upper altitude limits of the aircraft, said limits being determined by adding and subtracting a predetermined margin to and from the current altitude of the aircraft.

Determination of the aeronautical zones the ceiling of which is greater than the lower altitude limit and the floor less than the upper altitude limit.

Advantageously, the method synthesizes at least one second window representing an altimetric representation in vertical cross section of the terrain being flown over, comprising the aeronautical zones seen in vertical cross section.

According to a particular embodiment of the method, when the cartographic image of the terrain being flown over is a plan view, the altimetric representation includes a shading representative of the relief of the terrain.

Advantageously, when the cartographic image of the terrain being flown over is a plan view, the limit of an aeronautical zone is represented by a fine unbroken colored line prolonged by a colored semi-transparent border located inside said zone, the color of the line and of the border depending on the zone type. The method displays at least one box of information corresponding to an aeronautical zone, said box being selected by the user of said method, the box includes the name of the zone, its radio frequency, its type, its ceiling and its floor.

The invention also relates to a display screen, the display on this screen being controlled by a display method according to the invention, and an aircraft including at least this screen or a multi-purpose screen, the display of which is controlled by a display method according to the invention.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention.

Accordingly, the drawings and description thereof are to be regarded as illustrative in nature, and not as restrictive.

BRIEF DESCRIPTION OF THE DRAWINGS

The invention will be better understood, and other advantages will become apparent from reading the description that follows, given by way of non-limiting example, and with reference to the appended figures in which.

DETAILED DESCRIPTION OF THE INVENTION

The main source of graphic overloading in a cartographic representation containing both the altimetric data and the aeronautical zones of the terrain being flown over comes from the aeronautical zones. In practice, there can be many aeronautical zones, relatively muddled, in certain geographic areas.

The aeronautical zones do, however, have a property that cannot be exploited on paper maps. They are bounded altitude-wise and they are very rarely nested in each other. The aeronautical zones are defined by a geographic coverage and by two altitude limits, the bottom limit is called the floor and the top limit the ceiling. Thus, a first part of the aeronautical zones concerns only the low altitudes, those located, for example, around airports.

A second part concerns only the high altitudes, normally those linked to transit flight traffic. Depending on the flight phase, a pilot needs to know only a part of the aeronautical zones. For example, in the take-off and landing phases, it is important to know the low altitude zones around the airport, but the high altitude zones clutter the map needlessly.

Figure 1:
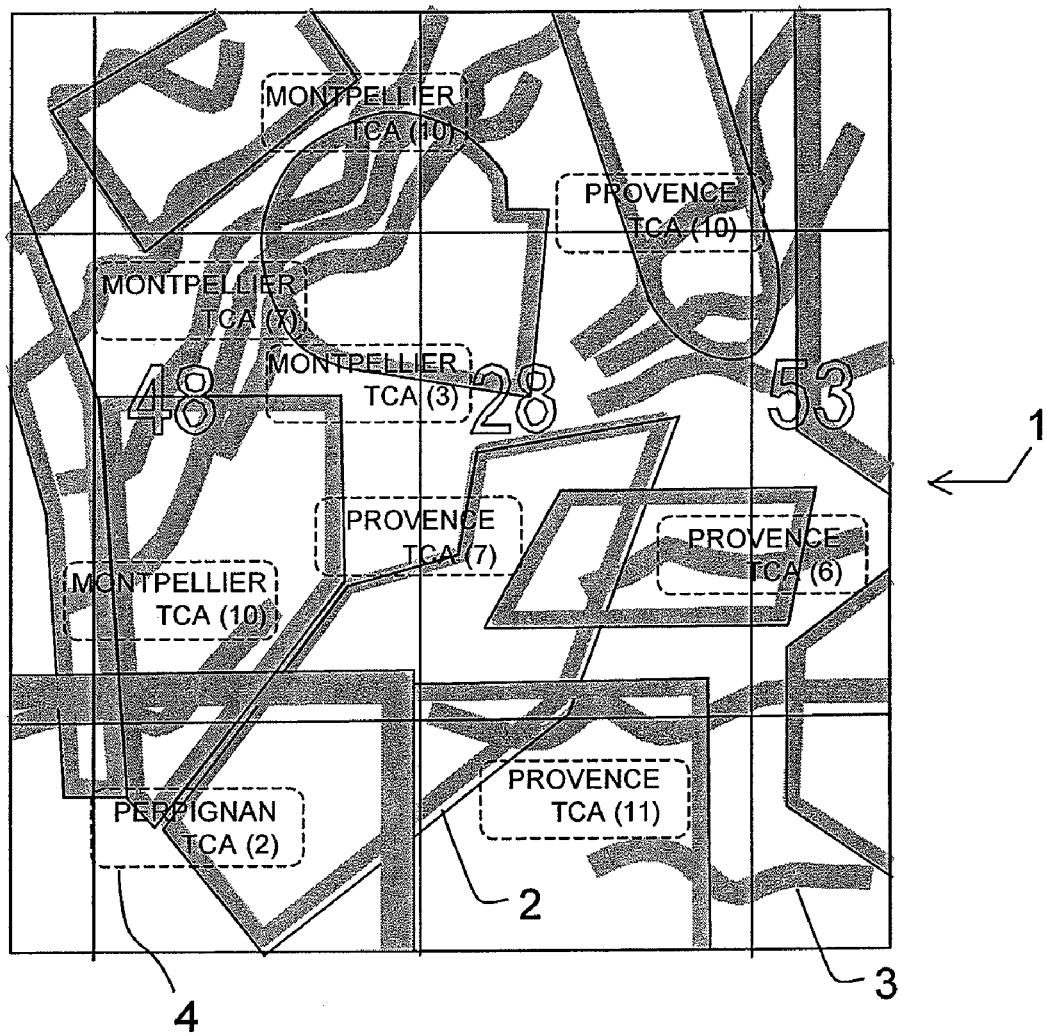
FIG. 1 represents a schematic view of a cartographic representation of the altimetric data and aeronautical zones according to the prior art.
Figure 2:
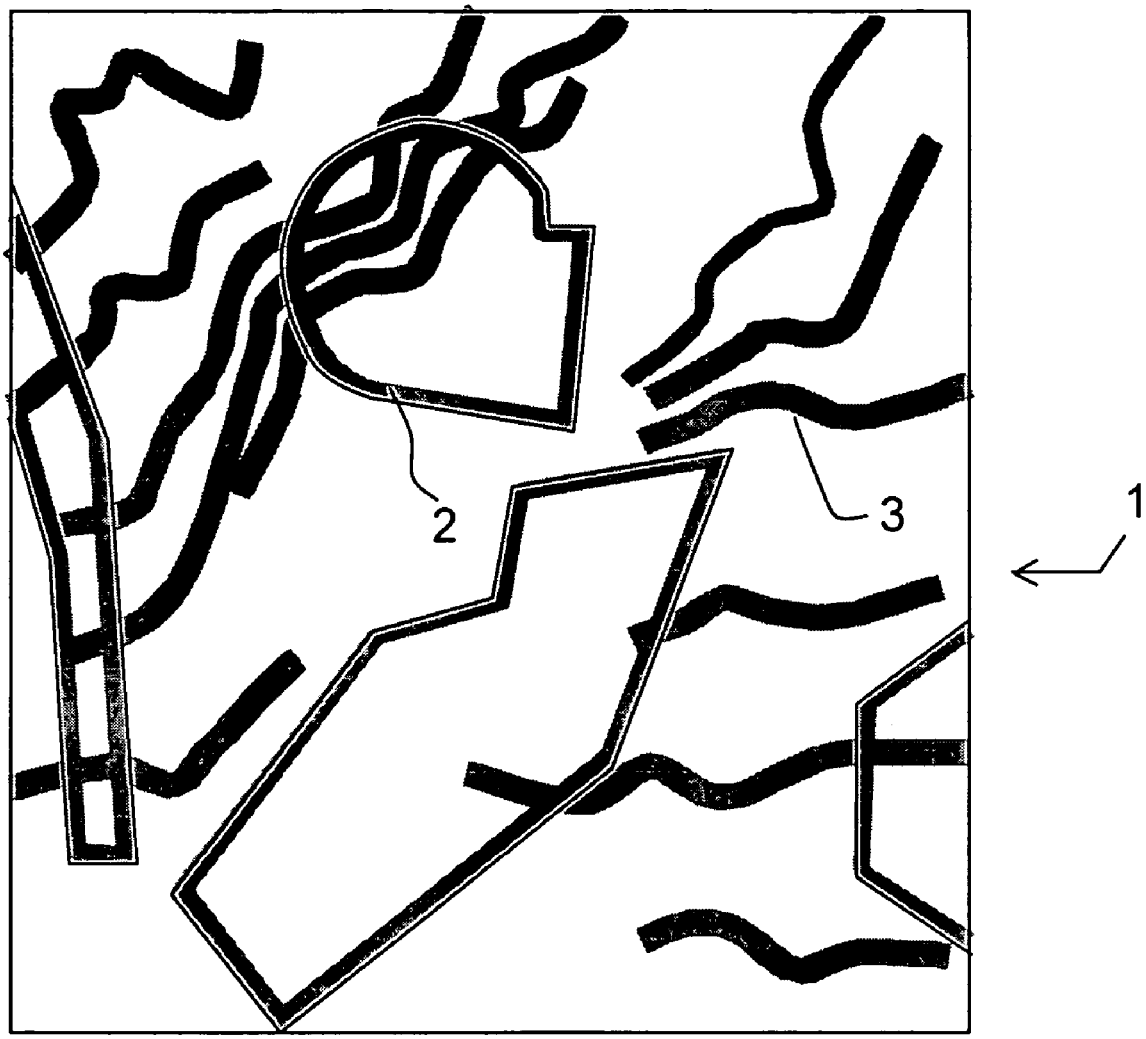
FIG. 2 represents a first schematic view of a cartographic representation of the altimetric data and aeronautical zones according to the invention.

The method according to the invention is based on this property. Thus, the method displays an altimetric representation of the terrain being flown over including only the aeronautical zones included in an altitude band corresponding to the flight phase of the aircraft, as shown in FIG. 2. The latter shows the same cartographic representation as FIG. 1, but in which only the aeronautical zones 2 involved in the flight phase of the aircraft are displayed.

Implementing the method is easy. The method must include steps for automatically filtering the aeronautical zones according to the geographic location and the vertical position of the aircraft. The filtering steps according to the vertical position of the aircraft perform the following functions:

Computation of the lower and upper altitude limits of the aircraft. These limits can be determined by adding and subtracting a predetermined margin to and from the current altitude of the aircraft.

Determination of the aeronautical zones with the ceiling greater than the lower altitude limit and the floor less than the upper altitude limit.

Thus, the zones with floor or ceiling altitudes far removed from that of the bearer are not displayed on the screen. The ceiling and the floor of these zones can be defined relative to the flight level, which is the altitude given relative to a standard barometric pressure, relative to the mean sea level, or even relative to the height above the ground. This zone selection considerably lightens the display, because some zones are defined very low around airports and are of no interest to a pilot in the cruising phase at high altitude. Similarly, certain zones are defined at high altitude for cruising aircraft, and are of no interest to aircraft in the approach phase.

Depending on the position of the aircraft in space, the aeronautical zones within reach of the aircraft are easily known. Thus, the pilot is also shown only the aeronautical zones that can affect his flight.

In FIG. 2, no boxes are displayed, further lightening the graphic representation. However, it is important for the useful boxes to be displayed to know the access categories of the aeronautical zones, the associated radio frequencies and other useful zone parameters. Displaying the boxes of all the zones at the same time needlessly clutters the cartographic presentation. Indeed, the pilot rarely needs all this information at the same time. In practice, only the boxes concerning the zones being crossed by the aircraft are of use to the pilot. Depending on the zones to be crossed, the pilot needs to know the access conditions and the associated radio frequencies. Thus, the method according to the invention can be used to display only one box at a time as represented in FIG. 3, which is the same as FIG. 2 apart from the display of the box 4, the display of the box being selected by the user using aircraft controls.

Figure 3:
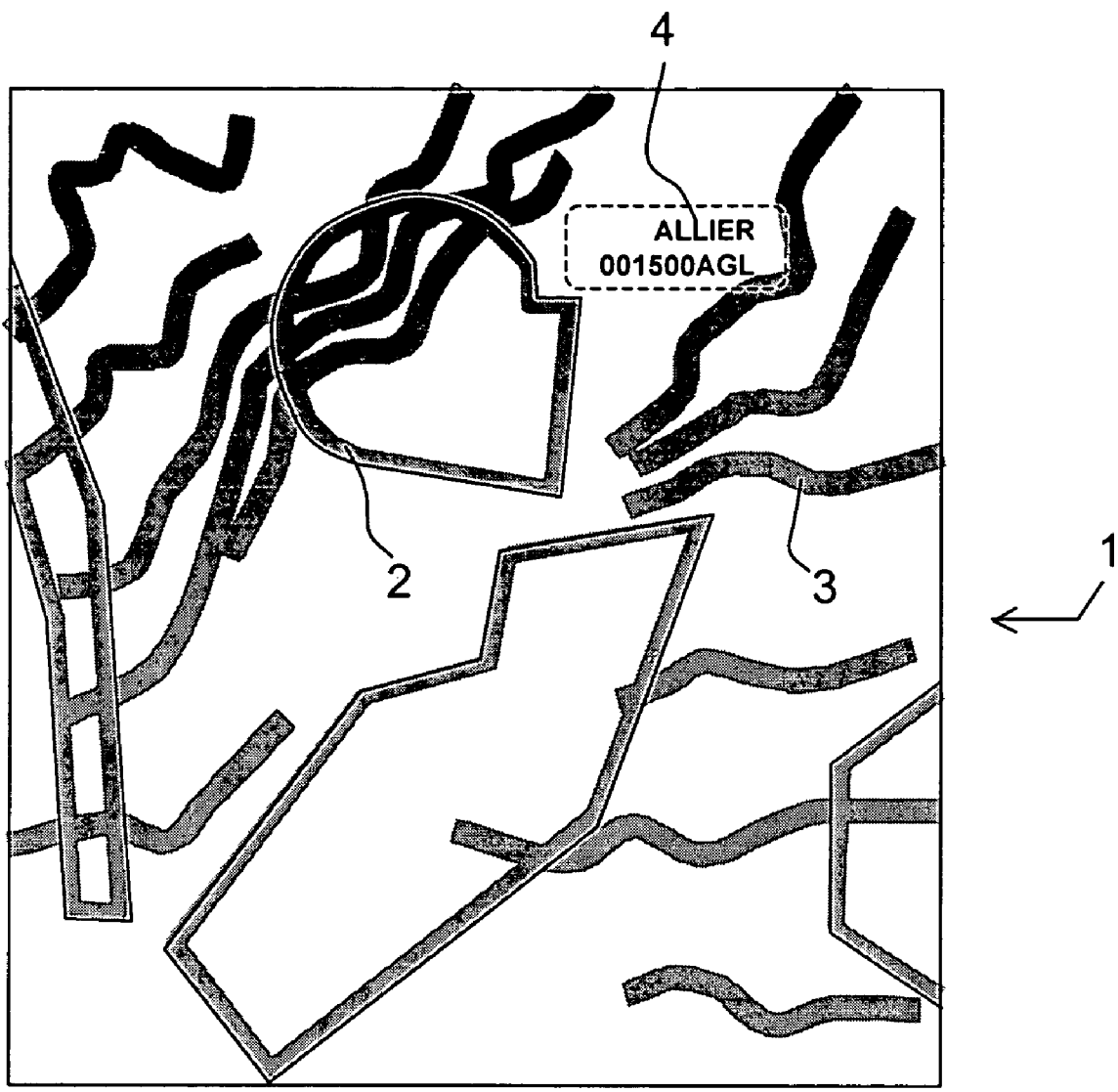
FIG. 3 represents a second schematic view of a cartographic representation of the altimetric data and aeronautical zones according to the invention.

FIGS. 2 and 3 show cartographic representations of the altimetric data and the aeronautical zones according to the invention in plan view in a single display window. For a better appreciation of the geometric situation of the aeronautical zones, it is advantageous to display in a second display window 10 a vertical cross-sectional view of the relief of the terrain and of the aeronautical zones. The pilot thus more easily grasps the aeronautical zones affected by a defined path of his aircraft. This presentation gives an easy three-dimensional interpretation of the position of the aeronautical zones. It provides for a very good representation of the vertical situation of the zones and thus considerably lightens the anticipation aspect of the job of the pilot. A model aircraft 7 can be represented on the cross-sectional view in order to further facilitate the location of the aircraft relative to the relief.

Figure 4:
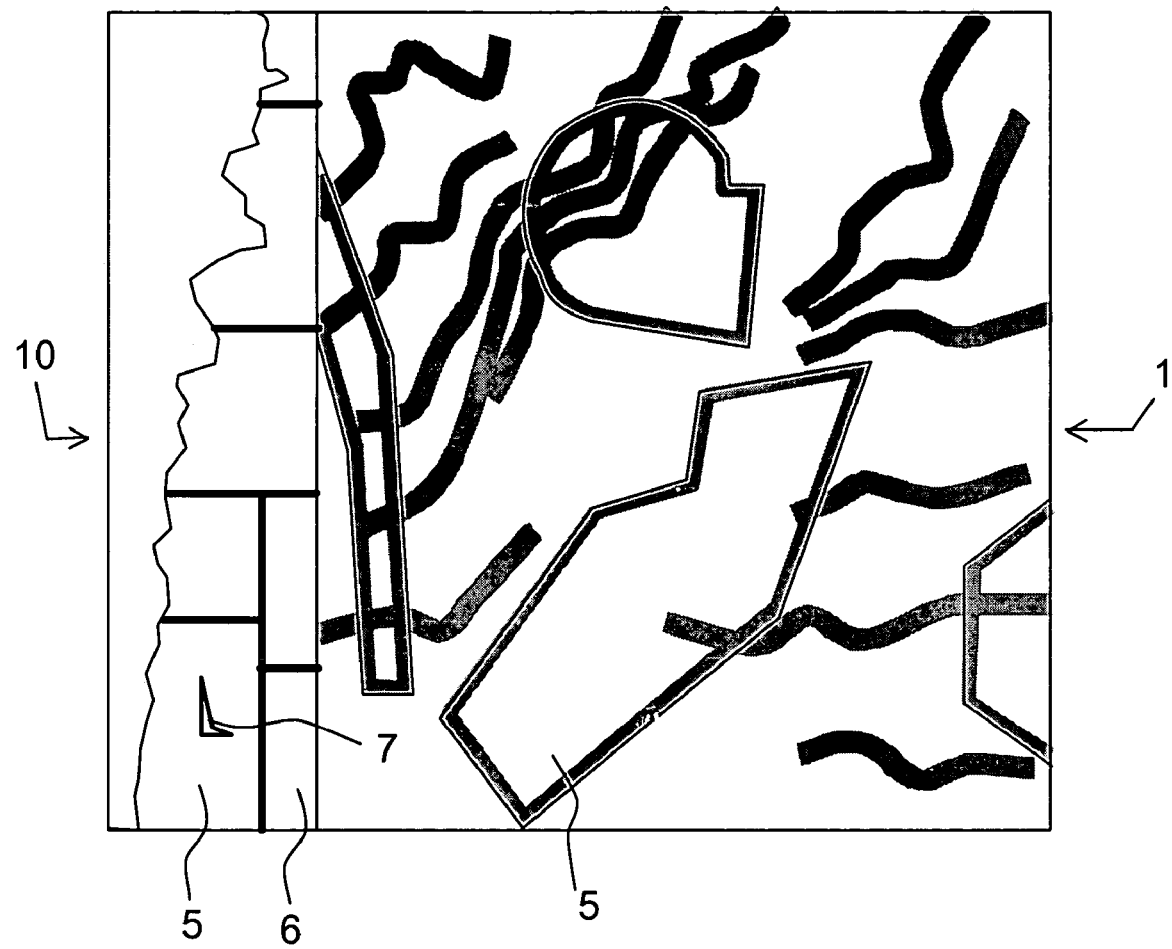
FIGS. 4 and 5 represent a third schematic view of a cartographic representation of the altimetric data and aeronautical zones according to the invention for two different altitudes of the aircraft.
Figure 5:
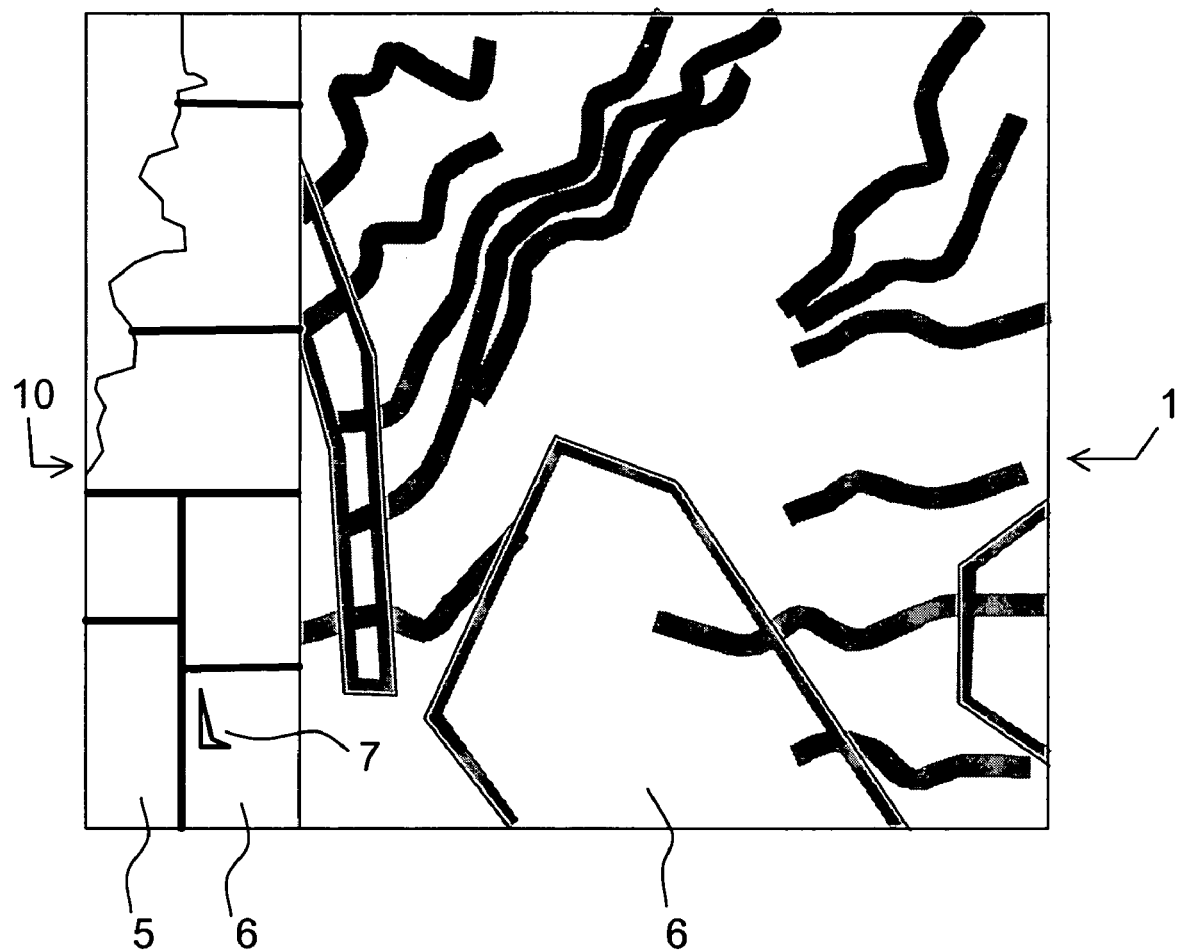

FIGS. 4 and 5 represent a schematic view of a cartographic representation of the altimetric data and the aeronautical zones comprising two windows 1 and 10, the main window 1 representing a plan view and the side window 10 representing a cross-sectional view. FIGS. 4 and 5 represent the same portion of terrain for two different altitudes of the aircraft, the aircraft altitude of FIG. 5 being higher than that of FIG. 4. The aeronautical zones represented change according to the altitude. Thus, in FIG. 4, the airplane is within the aeronautical zone 5 and under the aeronautical zone 6 as can be seen in the cross-sectional view. On the plan view, only the aeronautical zone 5 is represented. In FIG. 5, the airplane is above the aeronautical zone 5 and inside the aeronautical zone 6 as can be seen on the cross-sectional view. In the plan view, only the aeronautical zone 6 is represented.

Figure 6:
FIG. 6 represents a fourth schematic view of a cartographic representation of the altimetric data and aeronautical zones according to the invention.

In FIGS. 4 and 5, the window 10 representing the cross-sectional view is attached to one of the vertical sides of the window 1. For reasons of convenience or shape of the display device, the window 10 can be placed on one of the horizontal sides of the window 1, as shown in FIG. 6.

The synthesis method according to the invention requires means that are normally available on the avionics and helivionics systems of modern aircraft.

The complete system for displaying the three-dimensional image according to the invention comprises:

One or more control station type man-machine interfaces enabling the pilot to select the information that he needs and in particular the display of the boxes associated with the aeronautical zones.

Means of geographically locating the aircraft in space comprising:

Sensors (inertial unit, global positioning type satellite location system, etc);

Probes (anemo-barometric probes, gyroscopic sensors, accelerometers, etc);

A navigation unit for processing data from the systems of sensors and probes and for determining the geographic position, the altitude and the attitude of the aircraft;

A unit for generating a summary cartographic image comprising the image of the terrain and of the aeronautical zones represented according to one of the presentation modes according to the invention. Said unit comprises:

A cartographic database containing at least the terrain relief information;

A database including the aeronautical map information;

A unit for processing and automatically filtering aeronautical zones according to the geographic location and the vertical position of the aircraft;

At least one display device disposed on the instrument panel, of multi-function display (MFD) type, providing for a real-time representation of the three-dimensional image of the terrain and of the aeronautical zones either on a single window or on two windows.

Electronic links interlink the various units of the complete system. The various information is transmitted via data buses according to aeronautics-specific standards.

The method is more particularly dedicated to helivionics applications and to visual flight on helicopters.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A method of synthesizing a cartographic image on an aircraft screen, comprising the steps of:

generating at least one first window displaying a cartographic image in plan view of a terrain being flown over by said aircraft, wherein generating the cartographic image includes combining a cartographic image from altimetric information of the terrain with aeronautical zone information, wherein the method displays in said window, an altimetric representation of the terrain being flown over, wherein the aeronautical zone information displayed is from only aeronautical zones in an altitude band corresponding to a flight phase of the aircraft.

2. The synthesis method as claimed in claim 1, wherein the method comprises steps for automatically filtering the aeronautical zones according to the geographic location and the vertical position of the aircraft.

3. The synthesis method as claimed in claim 2, wherein the filtering steps according to the vertical position of the aircraft include:

computing lower and upper altitude limits of the aircraft, said limits being determined by adding and subtracting a predetermined margin to and from a current altitude of the aircraft.

determining at least one aeronautical zone such that a ceiling at least one aeronautical zone is greater than the lower altitude limit of the aircraft and floor of the at least one aeronatucial zone is less than the upper altitude limit of the aircraft.

4. The synthesis method as claimed in claim 1, wherein the method further comprises:

synthesizing at least one second window representing an altimetric representation in vertical cross section of the terrain being flown over, the window displaying the aeronautical zones seen in vertical cross section.

5. The synthesis method as claimed in claim 1, wherein, when the cartographic image of the terrain being flown over is a plan view, the altimetric representation includes a shading representative of the relief of the terrain.

6. The synthesis method as claimed in claim 1, wherein, when the cartographic image of the terrain being flown over is a plan view, the limit of an aeronautical zone is represented by a fine unbroken colored line prolonged by a colored semi-transparent border located inside said zone, the color of the line and of the border depending on the zone type.

7. The synthesis method as claimed in claim 1, wherein, when the cartographic image of the terrain being flown over is a plan view, the method displays at least one box of information corresponding to an aeronautical zone, said box being selected by the user of said method.

8. The synthesis method as claimed in claim 7, wherein the box includes the name of the zone, its radio frequency, its type, its ceiling and its floor.

9. A display screen, wherein the display on this screen is controlled by a display method as claimed in claim 1.

10. A helicopter, which includes at least one screen as claimed in claim 9.

11. A helicopter, which includes a multi-purpose screen, the display of which is controlled by a display method as claimed in claim 1.

* * * * *